United States Patent
Davis et al.

(10) Patent No.: US 7,526,118 B2
(45) Date of Patent: Apr. 28, 2009

(54) DIGITAL VIDEO OPTICAL INSPECTION APPARATUS AND METHOD FOR VERTICALLY SECTIONING AN OBJECT'S SURFACE

(75) Inventors: David Scott Davis, Canandaigua, NY (US); Albert G. Choate, Rush, NY (US); Jason N. Couvutsakis, Rochester, NY (US); Karl J. Lenz, Wiesbader (DE)

(73) Assignee: Quality Vision International, Inc, Rochester, NY (US)

( * ) Notice: Subject to any disclaimer, the term of this patent is extended or adjusted under 35 U.S.C. 154(b) by 941 days.

(21) Appl. No.: 10/634,944

(22) Filed: Aug. 6, 2003

(65) Prior Publication Data

US 2005/0031184 A1 Feb. 10, 2005

(51) Int. Cl.
*G06K 9/00* (2006.01)
(52) U.S. Cl. .................. 382/141; 382/152; 382/254; 345/553
(58) Field of Classification Search ............... 382/141, 382/242, 232, 151, 144, 145, 152, 173, 199, 382/216, 254, 285, 294; 360/69, 79; 348/910, 348/571, 578, 584; 345/530, 553
See application file for complete search history.

(56) References Cited

U.S. PATENT DOCUMENTS

| | | | | |
|---|---|---|---|---|
| 4,616,833 A * | 10/1986 | Geller | .......................... | 463/51 |
| 4,692,815 A * | 9/1987 | Kawahara et al. | .......... | 386/119 |
| 5,191,213 A * | 3/1993 | Ahmed et al. | ............... | 250/310 |
| 5,235,528 A * | 8/1993 | Silver et al. | ..................... | 378/7 |
| 5,517,311 A * | 5/1996 | Takeuchi et al. | ............ | 356/606 |
| 5,668,665 A * | 9/1997 | Choate | ....................... | 359/663 |
| 5,978,440 A * | 11/1999 | Kang et al. | .................... | 378/21 |
| 6,128,086 A * | 10/2000 | Fowler et al. | ............... | 356/616 |
| 6,518,996 B1 * | 2/2003 | Polidor et al. | ................ | 348/95 |
| 7,110,118 B2 * | 9/2006 | Unlu et al. | ................... | 356/450 |
| 2003/0184558 A1 * | 10/2003 | Ohba | ......................... | 345/592 |

OTHER PUBLICATIONS

Takanashi Nobuaki, "three-dimensional video identification device, threedimensional video identification method and computer readable recording medium", Mar. 30, 2001.*
Albert G. Choate, "Optical and digital processing techniques in a machine vision metrology system", Optical Engineering 28(12), 1311-1316 (Dec. 1989).

* cited by examiner

*Primary Examiner*—Sheela C Chawan
(74) *Attorney, Agent, or Firm*—Shlesinger & Fitzsimmons

(57) ABSTRACT

A method for generating a vertical section of an object surface under inspection by a digital optical-video inspection system movable along a vertical Z axis, comprising obtaining a video image of the object surface; overlaying over the video image on the object surface a sectioning band along a section vector to make a vertical section of the object, the band comprising a number of regions of pixels, the center of each region being a sampling point along the section vector; generating a series of video images of the object surface at several Z axis positions; computing a focus quality measurement $Q(n)$ for each region at each Z axis position $Z(n)$; computing a best focus quality measurement the series of $Q(n)$; and generating a vertical cross-section of the object surface from a set of points x,y,z obtained at each best focus location.

6 Claims, 3 Drawing Sheets

DIGITAL VIDEO OPTICAL INSPECTION APPARATUS AND METHOD FOR VERTICALLY SECTIONING AN OBJECT'S SURFACE

FIELD OF THE INVENTION

The present invention relates generally to a digital video optical inspection apparatus and particularly to an apparatus and method for performing a vertical sectioning of an object's surface.

OBJECTS AND SUMMARY OF THE INVENTION

It is an object of the present invention to provide a method for performing a vertical sectioning of an object's surface that can be implemented in an optical-video inspection apparatus.

It is another object of the present invention to provide an optical-video inspection apparatus having the capability of providing a vertical cross-section of the object's surface under inspection.

The present invention provides a method for generating a vertical section of an object surface under inspection by a digital optical-video inspection system movable along a vertical Z axis, comprising obtaining a video image of the object surface; overlaying over the video image on the object surface a sectioning band along a section vector to make a vertical section of the object, the band comprising a number of regions of pixels, the center of each region being a sampling point along the section vector; generating a series of video images of the object surface at several Z axis positions; computing a focus quality measurement Q(n) for each region at each Z axis position Z(n); computing a best focus quality measurement the series of Q(n); and generating a vertical cross-section of the object surface from a set of points x,y,z obtained at each best focus location.

The present invention also provides a digital optical-video inspection apparatus, comprising a video optical system mounted for vertical movement along a vertical Z axis toward and away from an object plane; and a worktable having a top surface disposed at the object plane. The video optical system includes a video camera for generating an image of an object disposed on the worktable. The video optical system includes a programmable device operably connected to the video camera and a monitor for displaying the image of the object. The programmable device includes a program for generating a vertical section of the object's surface.

These and other objects of the present invention will become apparent from the following detailed description.

BRIEF DESCRIPTIONS OF THE DRAWINGS

DETAILED DESCRIPTION OF THE INVENTION

Figure 1:
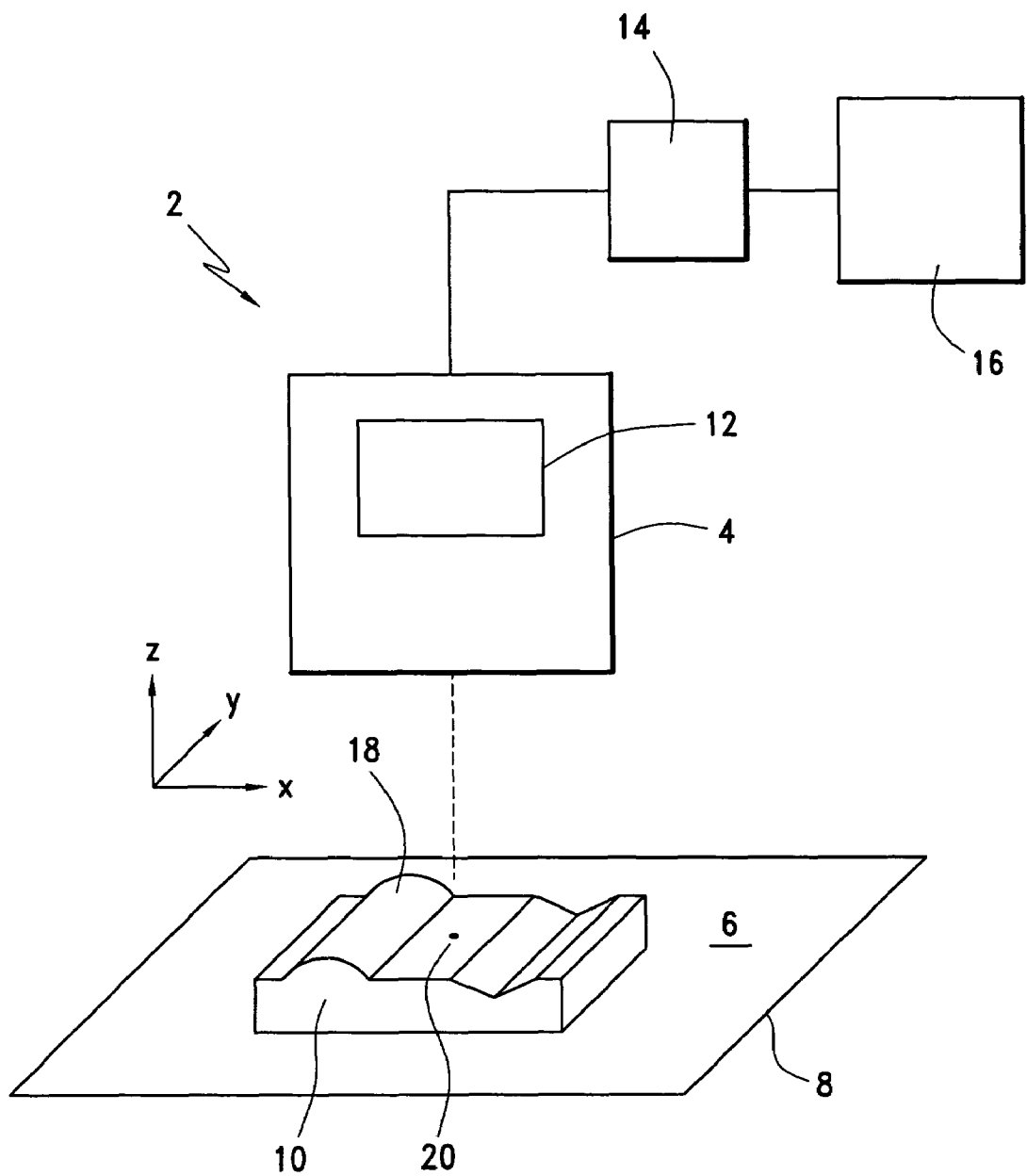
FIG. 1 is a functional block diagram of an optical metrological measuring apparatus using the present invention.

Referring to FIG. 1, a metrological measuring apparatus 2 utilizing the present invention is disclosed. The apparatus 2 comprises a video optical system 4 mounted in a conventional manner for vertical movement parallel to a vertical axis Z and toward and away from an object plane represented by a horizontal top surface 6 of a conventional worktable 8. An object 10 to be inspected is mounted on the top surface 6 of the worktable 8. A video camera 12 provides an image of the object 10 to a programmable device 14, such as a microprocessor, CPU, computer or similar device for observation in a video monitor 16. The apparatus 2 is generally disclosed in U.S. Pat. No. 5,668,665, herein incorporated by reference.

The object 10 includes a top surface 18 to be inspected using the apparatus 2. A point 20 on the surface 18 is brought into focus by moving the apparatus 2 at discrete points along the Z axis and taking an image of the point 20 at each step. Each image of the point 20 associated with each Z step is analyzed for best focus to determine the Z position of the point 20.

The best focus of an image can be associated with the maximization of the intensity gradient, indicating the sharpest detail. Video image consists of an array of pixel intensities, where I(i,j) represents the intensity registered by the pixel in row i and column j. To measure the gradient at a given pixel location in the image, the intensity of the pixel to the right minus that of the pixel to the left indicates the X component of the intensity gradient. Similarly, the intensity of the pixel above minus that of the pixel below gives the Y component of the intensity gradient, as in change of intensity per two pixels spaces. The gradient squared is calculated as the sum of X gradient squared and the Y gradient squared, which is, $$(I(i+1,j)-I(i-1,j))^2+(I(i,j+1)-I(i,j-1))^2.$$

The gradient squared is a useful measure of focus quality for any pixel located within the image field.

Figure 2:
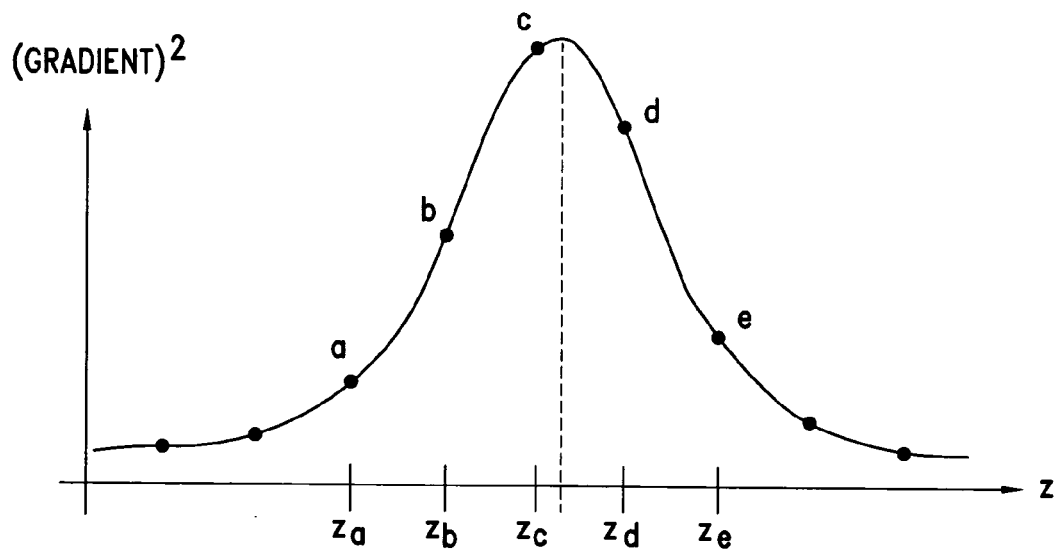
FIG. 2 is a typical focus quality curve generated by discrete sampling points along the vertical (Z) axis.

As the apparatus 2 is scanned in the Z direction through best focus, the value of the gradient squared reaches a peak and then declines, as best shown in FIG. 2. The autofocus curve is produced by positioning the apparatus 2 at various discrete Z locations, such as at points Za, Zb, Zc, Zd, and Ze, thereby obtaining a series of images at successive Z steps for focus analysis. More typically, the apparatus 2 is scanned in the Z direction while the video image is monitored to provide corresponding Z location images, although the timing effects of the image accumulation and extraction need to be taken into account. In either case, the result is a series of discrete sample points a, b, c, d and e, for example, along the autofocus curve, and the location of the object surface point is associated with the best focus represented by the peak of the curve and the corresponding Z position.

The determination of the peak of the curve and the corresponding Z location of best focus is done by a digital analysis method that finds the zero-crossing of the first derivative of the autofocus curve, as disclosed in Choate, Albert G., *Optical and Digital Processing Techniques in a Machine Vision Metrology System*, Optical Engineering 28(12), 1311-1316 Dec. 1989, hereby incorporated by reference. This amounts to finding a local rate of change of the gradient squared versus Z location, as in units of intensity squared per Z step, and the local rate of change of that rate of change, as in gradient squared per step per step. At the peak of the curve, the rate of change of the gradient squared signal is zero, so these values can used to determine where that zero-crossing occurs, if in the neighborhood of that Z sampling. More specifically, the particular formula employed uses five successive autofocus values, say a, b, c, d, and e, as shown in FIG. 2, where the best focus Z is then computed as, $$Z=Zc+(step/2)(-a-2b+2d+e)/(-a+2c-e).$$

In practice, the central Zc can be represented as $(Za+4Zb+6Zc+4Zd+Ze)/16$, which tends to smooth out any errors in the Z sampling process, and the Z step sizes as $(-Za-2Zb+2Zd+Ze)/8$, which computes sort of a local average step size. In the step subdivision formula $(-a-2b+2d+e)/(-a+2c-e)$, the denominator represents the height and sharpness of the peak, and is required to exceed a certain minimum so as to ignore peaks generated by signal noise. When the denominator is large enough, indicating a valid hump, and the subdivision formula gives a value between –1 and +1 half-step, the focus lies within the neighborhood of the central Zc, and the apparent height is thus measured. If the partial derivatives relative to the pixel intensities (the actual original data) are analyzed to determine the effects of pixel noise, it is found that the subdivision denominator serves as a measure of the accuracy of the computation, which is useful when combining or comparing data. Also, considering the noise factors and the effects of step size, it can be shown that precision is optimized for this particular algorithm when the 5 sampling points straddle the bulk of the autofocus curve hump, as suggested in FIG. 2.

The autofocus Z measurement at a single isolated pixel is quite uncertain, and sometimes unreliable. To obviate this problem, the present invention uses groupings of pixels to arrive at the focus quality measurements, as will be discussed below.

Pixels are grouped into autofocus regions around a point to be measured, each region having an x and y given by the average pixel location (its center) representing the point to be measured. The focus quality measurement for a given autofocus region is the sum of all the gradient squared for each pixel in that region. The focus quality signal is computed at the sequence of Z positions, yielding a series of focus quality measurements, Q(n), and associated Z positions, Z(n). The computed Z height and best focus for the point being measured are then determined by checking that sequence of data to find the sample n where the magnitude of $-Q(n-2)+2Q(n)-Q(n+2)$ exceeds a minimum threshold and is greater than or equal to the magnitude of $-Q(n-2)-2Q(n-1)+2Q(n+1)+Q(n+2)$, for then $Z=((Z(n-2)+4Z(n-1)+6Z(n)+4Z(n+1)+Z(n+2))/16+(-Z(n-2)-2Z(n-1)+2Z(n+1)+Z(n+2))/16)$ $((-Q(n-2)-2Q(n-1)+2Q(n+1)+Q(n+2))/(-Q(n-2)+2Q(n)-Q(n+2))$+timing factors, where timing factors account for the difference between when Z(n) is registered and Q(n) is recorded when in a continuous scanning mode. By using the gradient squared as the measure of focus quality, when pixel groups are compiled, the strongest signals with the least relative noise are then properly emphasized, and the Z measurement becomes much more repeatable and reliable. Note that Q(n–2), Q(n–1), Q(n), Q(n+1) and Q(n+2) refer to gradient squared a, b, c, d and e, respectively, in FIG. 2. Similarly, Z(n–2), Z(n–1), Z(n), Z(n+1) and Z(n+2) refer Za, Zb, Zc, Zd and Ze, respectively, in FIG. 2.

The above autofocus measurement techniques are used to vertically section an object's surface, and generate a series of x,y,z points that represent the surface contour as though it was sectioned vertically. The contour consisting of a series of sampled points are then typically analyzed, using conventional methods, to determine the slope of the surface, the curvature of cylindricity, the intersection of surfaces, or any other complex contour characteristics appropriate to the desired measurement being performed.

Figure 3:
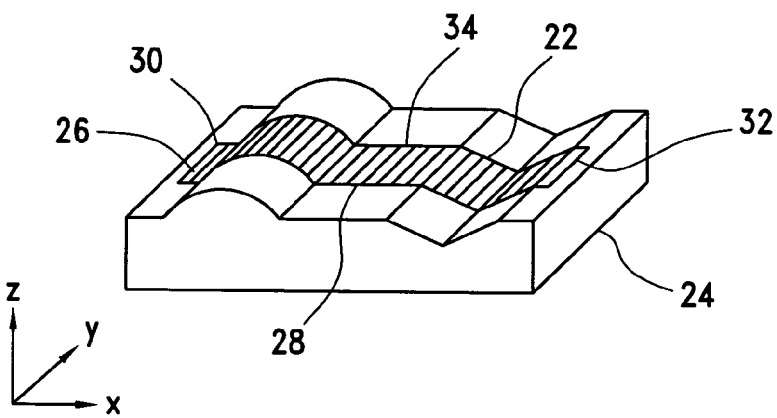
FIG. 3 is an image of the object being inspected showing a sectioning band overlayed on the image along a direction where a vertical section of the work piece's surface is desired to be taken.

To vertically section the object's surface, a sectioning band 22 is overlayed on the image 24 of the object 10. The sectioning band 22 is chosen generally to align with the slope or gradient direction of the surface tomography of the object, as best shown in FIG. 3. In so far as the slope is consistent across the gradient, as in the breadth of a hill, the band 22 can be given a width 26 that permits averaging of pixels across its width, while the length 28 of the band indicates the extent and direction of the sectional measurement. The band 22 has a starting point 30 and an ending point 32 and comprises a strip of contiguous autofocus regions 34, as best shown in FIGS. 3 and 4. The width of the band 22 may be changed and the number of the sampling points 36 along the vertical section, as represented by a section vector 38, may be selected, which modifies the length of each autofocus region 34. The length 28 of the band 22 indicates the extent and direction of the sectional measurement. The width 26 of the band 22 determines the number of pixels in a transverse row. The wider the band 22, the more pixels are included in the transverse row and the better the averaging effect, as discussed above. The sectioning band 22 is typically located in the X, Y image plane aligned to produce the desired Z-cross-section. Each separate region 34 is analyzed to produce a measured Z point associated with the center 36 of each region 34. At the highest density of sample points 36 along the section vector 38, there would be a series of Z points separated by one pixel, while at lowest density there might only be two regions 34, which then would be capable of measuring the inclination angle of the surface, but with maximum precision. For each region 34, the gradient squared of the constituent pixels are summed, as discussed above, and treated as a single autofocus measurement.

Figure 5:
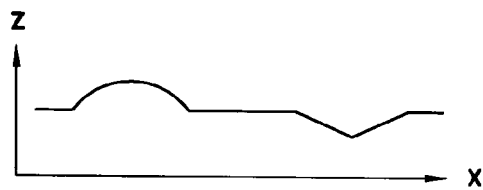
FIG. 5 is a graphic representation of the measured surface contour points generated by the actual sectioning process.

The strips of juxtaposed autofocus regions 34 then yield a series of measured points, x,y,z coordinates, centered at each separate region that represent the contour of the object's surface as though it were sectioned vertically. A graphic representation of the measured surface contour points is produced, an example of which is shown in FIG. 5, showing the component region center heights versus their location along the section.

Figure 4A:
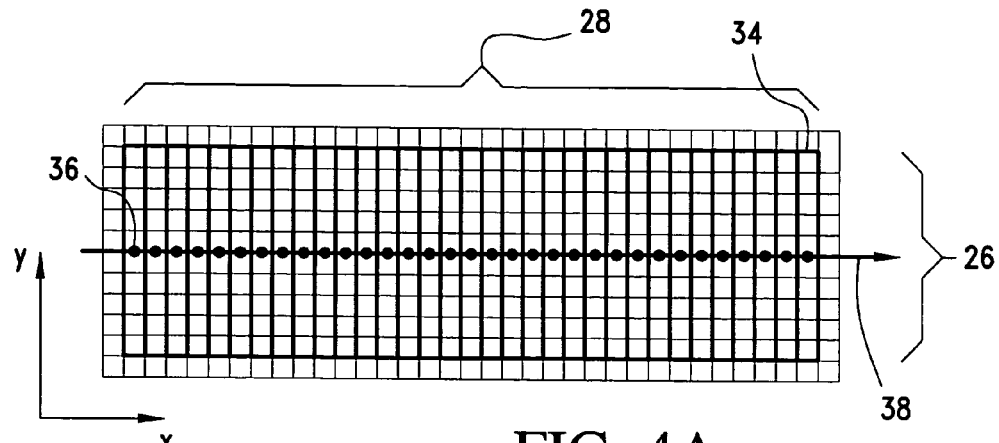
FIGS. 4A, 4B, 4C and 4D are various examples of sectioning bands having various size component autofocus regions dictated by the number of sampling points along the length of the sectioning band.
Figure 4B:
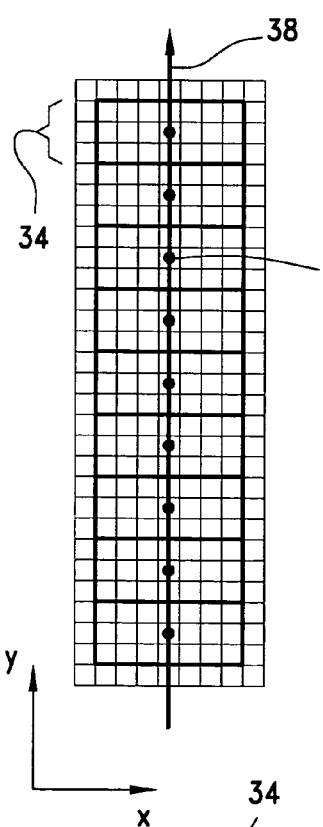
Figure 4C:
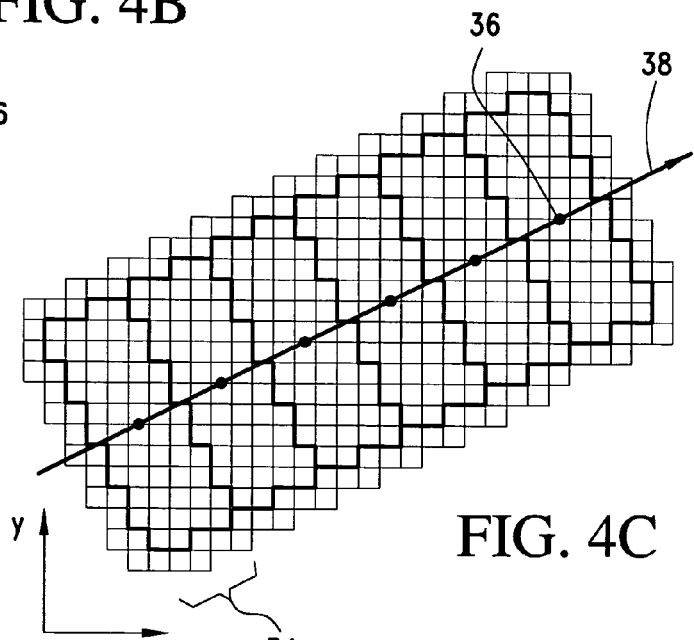
Figure 4D:
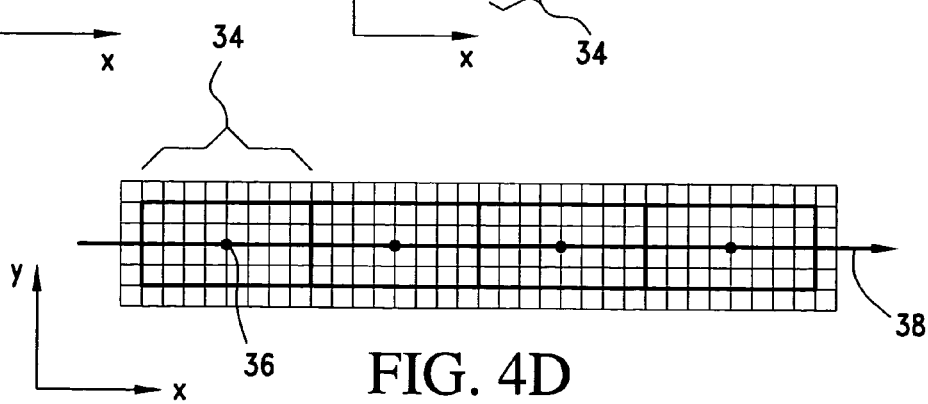

Various examples of sectioning bands 22 are shown in FIGS. 4A, 4B, 4C and 4D. In FIG. 4A, each region 34 is one pixel long and ten pixels wide. In FIG. 4B, each region 34 is three pixels long and seven pixels wide. In FIG. 4C, each region 34 is eight pixels long and four pixels wide. When the sectioning band is not aligned along the X or Y axis, such as that shown in FIG. 4D, the transverse association of pixels involves both directly and diagonally adjacent pixels so as to best represent the desired line. In each of the figures, the cross-section of the surface contour is taken along the vector line 38 made up of the sampling points 36.

The sectioning band 22 need not be rectangular, where various styles of curved bands might be appropriate for specific applications. Successive sampling regions 34 could also overlap.

The present invention could also be applied to other systems that are capable of producing the equivalent of Z height data field, such as confocal microscope scanner, scanning lasers, or mechanical probing systems.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for generating a vertical section of an object surface under inspection by a digital optical-video inspection apparatus movable along a vertical Z axis, comprising;
   a) obtaining a video image of the object surface;
   b) overlaying over the video image on the object surface of a sectioning band along a section vector to make a vertical section of the object, the band comprising a number of regions of pixels, the center of each region being a sampling point along the section vector;
   c) generating a series of video images of the object surface at several Z axis positions;
   d) computing a focus quality measurement Q(n) for each region at each Z axis position Z(n);
   e) computing a best focus quality measurement from step d); and
   f) generating a vertical cross-section of the object surface from a set of points x,y,z obtained at each best focus location.

2. A method as in claim 1, wherein said sectioning band is rectangular.

3. A method as in claim 1, wherein said regions are aligned in series along the sectioning vector and each region is juxtaposed to an adjacent region.

4. A method as in claim 1, wherein said focus quality measurement Q(n) for each region is summation of a focus quality measurement for each pixel within the region, using the formula, $$(I(i+1,j)-I(i-1,j))^2+(I(i,j+1)-I(i,j-1))^2,$$

where,
   I(i,j) represents the intensity registered by the pixel in row i and column j,
   I(i+1,j) represents the intensity of the pixel to the right,
   −I(i−1,j) represents the intensity of the pixel to the left,
   I(i,j+1) represents the intensity of the pixel above, and
   −I(i,j−1) represents the intensity of the pixel below.

5. A method as in claim 4, wherein:
   a) said best focus measurement is determined from the sequence of data Q(n) where −Q(n−2)+2Q(n)−Q(n+2) exceeds a minimum threshold and is greater than or equal to the magnitude of −Q(n−2)−2Q(n−1)+2Q(n+1)+Q(n+2); and
   b) Z at best focus is calculated from, $$Z=((Z(n-2)+4Z(n-1)+6Z(n)+4Z(n+1)+Z(n+2))/16+(-Z(n-2)-2Z(n-1)+2Z(n+1)+Z(n+2))/16)$$

$$((-Q(n-2)-2Q(n-1)+2Q(n+1)+Q(n+2))/(-Q(n-2)+2Q(n)-Q(n+2))$$

+ timing factors, where timing factors account for the difference between when Z(n) is registered and Q(n) is recorded when in a continuous scanning mode.

6. A digital optical-video inspection apparatus, comprising:
   a) video optical system mounted for vertical movement along a vertical Z axis toward and away from an object plane;
   b) a worktable having a top surface disposed at said object plane;
   c) said video optical system including a video camera for generating an image of an object disposed on said worktable;
   d) said video optical system including a monitor and a programmable device operably connected to said video camera for displaying the image of the object;
   e) said programmable device including a program for generating a vertical section of the object's surface; and
   (f) wherein said program comprises:
      (i) overlaying over the video image on the object's surface a sectioning band along a section vector to make a vertical section of the object, the band comprising a number of regions of pixels, the center of each region being a sampling point along the section vector;
      (ii) generating a series of video images of the object surface at several Z axis position;
      (iii) computing a focus quality measurement Q(n) for each region at each Z axis position Z(n);
      (iv) computing a best focus quality measurement from step c); and
      (v) generating a vertical cross-section of the object surface from a set of points x,y,z obtained at each best focus location.

* * * * *